(12) United States Patent
Bauer et al.

(10) Patent No.: US 12,732,125 B2
(45) Date of Patent: Sep. 8, 2026

(54) ELECTRICAL SYSTEM FOR AN ELECTRIC MACHINE

(71) Applicant: Rolls-Royce Deutschland Ltd & Co KG, Blankenfelde-Mahlow (DE)

(72) Inventors: Johannes Gabriel Bauer, Eching (DE); Johannes Heissenberger, Taufkirchen (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 197 days.

(21) Appl. No.: 18/696,330

(22) PCT Filed: Sep. 20, 2022

(86) PCT No.: PCT/EP2022/076056
§ 371 (c)(1),
(2) Date: Mar. 27, 2024

(87) PCT Pub. No.: WO2023/052194
PCT Pub. Date: Apr. 6, 2023

(65) Prior Publication Data

US 2024/0429848 A1 Dec. 26, 2024

(30) Foreign Application Priority Data

Sep. 28, 2021 (DE) ..................... 10 2021 210 797.4

(51) Int. Cl.
*H02P 25/16* (2006.01)
*B64D 27/32* (2024.01)

(52) U.S. Cl.
CPC ............. *H02P 25/16* (2013.01); *B64D 27/32* (2024.01)

(58) Field of Classification Search
CPC ...... H02P 25/16; H02P 6/187; H02P 2101/30; H02P 2207/05; H02P 2209/03; H02P 29/024; B64D 27/32
See application file for complete search history.

(56) References Cited

U.S. PATENT DOCUMENTS 6,204,627 B1 * 3/2001 Watanabe ........... H02M 5/4585 363/39
2003/0020452 A1 * 1/2003 Estrela ............... G01R 19/2513 324/86

(Continued)

FOREIGN PATENT DOCUMENTS

AT 516218 A1 3/2016
CN 206618840 U 11/2017

(Continued)

OTHER PUBLICATIONS

G. J. Lloyd, H. T. Yip and G. Millar, "Operation, Design and Testing of Generator 100% Stator Earth Fault Protection Using Low Frequency Injection," 2008 IET 9th International Conference on Developments in Power System Protection (DPSP 2008), Glasgow, 2008, pp. 92-97.

(Continued)

*Primary Examiner* — Bickey Dhakal
(74) *Attorney, Agent, or Firm* — Lempia Summerfield Katz LLC

(57) ABSTRACT

An electrical system (1A-1C) for an electric machine (2) comprises: at least three connections (A1-A3) for electrical connection to in each case one phase of an at least three-phase AC voltage; a first star circuit (10A-10C) with three strands (100A-100C) via each of which one of the at least three connections (A1-A3) is electrically connected to a common star point (101) of the first star circuit (10A-10C) and which each have at least (11A-11C) with three strands (110A-110C) via each of which one of the at least three (Continued)

connections (A1-A3) is electrically connected to a common star point (111) of the second star circuit (11A-11C) and which each have at least two tooth windings (Z) which are connected in series; and a measuring device (12), which is electrically connected between the first star circuit (10A-10C) and the second star circuit (11A-11C), for measuring an electrical variable.

15 Claims, 5 Drawing Sheets

(56) References Cited

U.S. PATENT DOCUMENTS

| | | | | |
|---|---|---|---|---|
| 2009/0128076 | A1* | 5/2009 | Taniguchi | H02P 25/22 318/400.41 |
| 2020/0228030 | A1* | 7/2020 | Bourse | H02M 7/5387 |
| 2022/0069651 | A1* | 3/2022 | Saito | B60L 50/51 |

FOREIGN PATENT DOCUMENTS

| | | | | |
|---|---|---|---|---|
| DE | 10327142 | A1 | 1/2005 | |
| DE | 102006061699 | A1 | 7/2008 | |
| DE | 102009004556 | A1 | 7/2010 | |
| DE | 102019118145 | A1 | 1/2020 | |
| DE | 102020100272 | A1 | 7/2020 | |
| EP | 1940007 | A1 | 7/2008 | |
| WO | WO-2019115350 | A1 * | 6/2019 | H02P 6/005 |
| WO | 2021053340 | A1 | 3/2021 | |

OTHER PUBLICATIONS

German Search Report from Application No. 10 2021 210 797.4, dated Jul. 29, 2022, 14 pages.

International Search Report and Written Opinion of the International Searching Authority from Application No. PCT/EP2022/076056, dated Jan. 23, 2023, 11 pages.

* cited by examiner

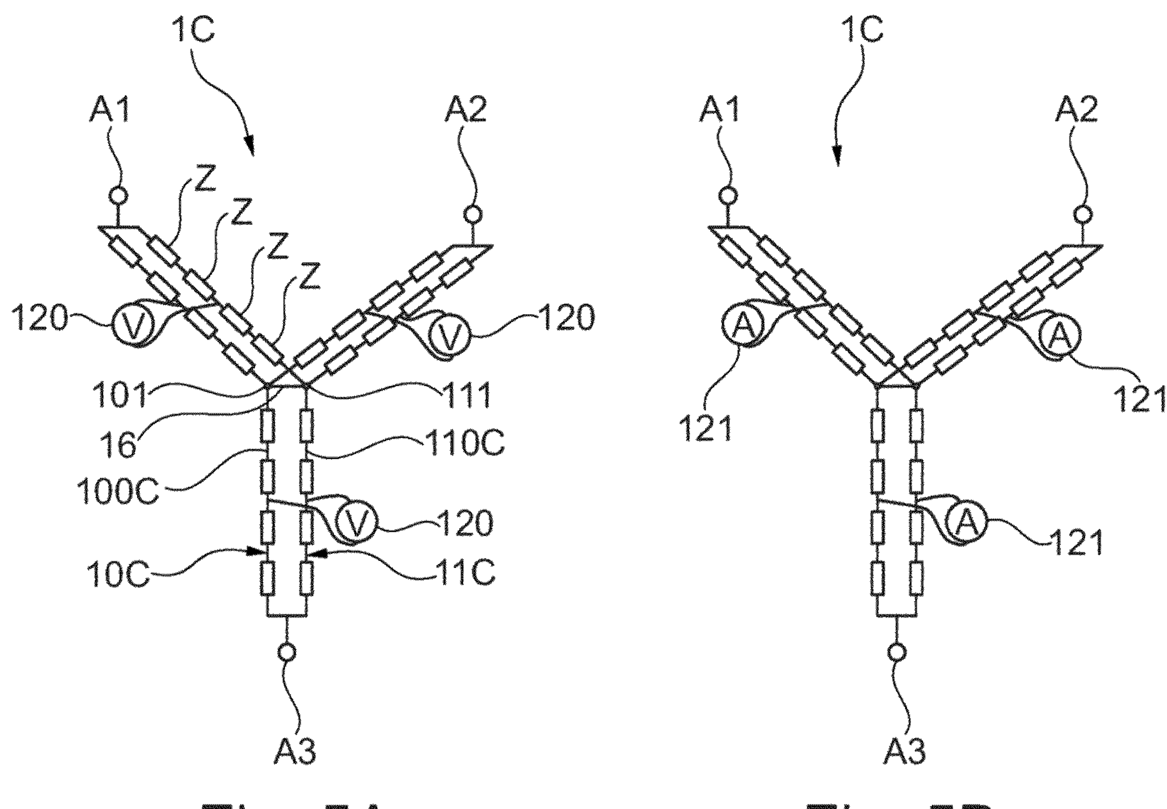
Fig. 5A
Fig. 5B
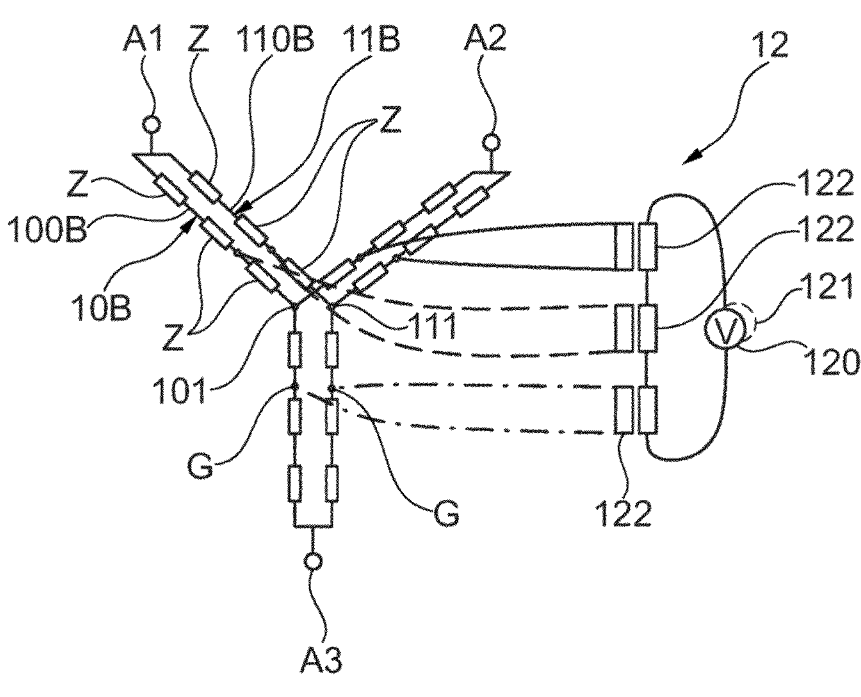
Fig. 6

ELECTRICAL SYSTEM FOR AN ELECTRIC MACHINE

This application is the National Stage of International Application No. PCT/EP2022/076056, filed Sep. 20, 2022, which claims the benefit of German Patent Application No. DE 10 2021 210 797.4, filed Sep. 28, 2021. The entire contents of these documents are hereby incorporated herein by reference.

BACKGROUND

The present disclosure relates to an electrical system for an electric machine.

Electrical systems include, for example, three connections for electrical connection to in each case one phase of a three-phase AC voltage, and a star circuit with three strands via each of which one of the three connections is electrically connected to a common star point and which each have a tooth winding. In the case of the electric machine (e.g., an electric motor or a generator), the tooth windings are mounted in each case (e.g., on a stator tooth of a stator of the electric machine). Electric machines having such a stator include, for example, a rotor (e.g., a permanently excited rotor) that is rotatable relative to the stator. Applying the three-phase AC voltage to the strands, and thus to the tooth windings, causes magnetic fields to build up. The magnetic fields move the rotor relative to the stator.

Especially in multiphase rotating field machines (e.g., having a permanently excited rotor), it proves to be problematic if a short circuit occurs inside the electrical system (e.g., at one of the tooth windings). For example, in such electric machines, there is the problem that a short circuit between adjacent turns of a tooth winding during intended operation may induce a large electrical current that may result in thermal destruction of the tooth windings or adjacent components (e.g., adjacent electrical, magnetic, and/or structural components). This is particularly relevant not only, but particularly, in aircraft in which, for example, permanently excited rotating field machines are used.

SUMMARY AND DESCRIPTION

The scope of the present disclosure is defined solely by the appended claims and is not affected to any degree by the statements within this description.

The present embodiments may obviate one or more of the drawbacks or limitations in the related art. For example, an improved electrical system for an electric machine is provided.

According to one aspect, an electrical system for an electric machine is provided. The electrical system includes at least three connections, each for electrical connection to in each case one phase of an at least three-phase AC voltage (e.g., a three-phase AC voltage), a first star circuit, and a second star circuit. The first star circuit includes three strands. Via each of the three strands, one of the three connections is in each case electrically connected to a first star point of the first star circuit. The first star point is common to the three strands of the first star circuit. Each of the three strands of the first star circuit has at least one tooth winding (e.g., at least two tooth windings that are connected in series). The second star circuit likewise includes three strands. Via each of the three strands of the second star circuit, one of the three connections is in each case electrically connected to a second star point of the second star circuit. The second star point is common to the three strands of the second star circuit. Each of the three strands of the second star circuit has at least one tooth winding (e.g., at least two tooth windings that are connected in series). The electrical system further includes a measuring device that is electrically connected between the first star circuit and the second star circuit, for measuring an electrical variable.

This is based on the knowledge that measuring the electrical variable between the two star circuits, and not, for example, between a star circuit and an external reference point, makes it possible to remove interference such as that caused by magnetic saturation or by external components, for example. As a result, it is possible to improve a signal-to-noise ratio (SNR), where the signal represents a share of the measured electrical variable caused by a short circuit. This allows short circuits to be detected with improved accuracy. Further, complex analysis or filtering of the measured electrical variable may be dispensed with, which allows a simplified construction and additionally a lower latency when detecting a short circuit. The shorter this latency, the faster countermeasures may be initiated (e.g., stopping the electric machine, switching off excitation of the electric machine (if the electric machine is externally excited), activating an active terminal short circuit via the inverter, and/or activating cooling). If countermeasures are initiated quickly, consequential damage may, for example, be reduced or completely avoided. The two star circuits may have the same design. An evaluation unit, for example, detects a short circuit based on the electrical variable (e.g., due to a voltage and/or a current above a predefined threshold value).

For example, the measuring device includes a voltmeter and/or an ammeter. The measured electrical variable is thus a voltage or a current, for example. Optionally, the measuring device measures both the voltage and the current. Measuring the voltage is relatively easy to implement; measuring the current in comparison allows a particularly high measurement accuracy since during normal operation no compensating current between the two star circuits is typically to be expected.

In one configuration, the measuring device (e.g., a voltmeter and/or ammeter of the measuring device) is electrically connected between the star points of the two star circuits. This allows a particularly simple connection and also allows all the strands to be monitored using only one voltmeter and/or ammeter.

Alternatively or in addition, the measuring device (e.g., a voltmeter and/or ammeter of the measuring device) is connected in each case between two tooth windings of one strand of the first star circuit and between two tooth windings of one strand of the second star circuit. As a result, these two strands may be monitored with particularly high precision.

Optionally, the measuring device is electrically connected to the strands between which the measuring device is connected, at a tap in each case. Further, in the case of one of or the two strands, the same number of tooth windings may be provided between the respective connection and the tap as between the tap and the respective star point. This allows improved measurement accuracy.

The strands, between which the measuring device is connected, may connect the respective star circuit to the same connection. The same phase may then be present at the two strands, for example.

The measuring device may include, for each phase, a respective voltmeter and/or ammeter that is electrically connected between in each case two tooth windings of the strands that are connected to the same connection. All the strands may be effectively monitored in this way.

Optionally, the measuring device includes a voltmeter and/or an ammeter that is operatively connected to the strands of one, a plurality of, or each phase via one or a plurality of magnetic couplers (e.g., transformer(s)). A plurality of phases may thus be monitored straight away using a single measuring apparatus, which allows a particularly simple construction.

The two star points may be electrically connected to one another directly (e.g., may be short-circuited together) by an electrical connecting conductor. This allows high measurement accuracy (e.g., in configurations with a large number of tooth windings).

According to one aspect, an electrical system for an electric machine that may be embodied according to any configuration described herein is provided. The electrical system includes at least three connections for electrical connection to in each case one phase of an at least three-phase AC voltage (e.g., a three-phase AC voltage), a first star circuit with three strands via each of which one of the three connections is electrically connected to a common star point of the first star circuit and which each have at least one tooth winding, and a second star circuit with three strands via each of which one of the three connections is electrically connected to a common star point of the second star circuit and which each have at least one tooth winding. The electrical system further includes a measuring device that is electrically connected between the first star circuit and the second star circuit, for measuring an electrical variable, and an inverter unit for providing the AC voltage. The inverter unit is connected to the three connections. In this case, the inverter unit may be configured to modulate a temporally varying signal onto the AC voltage as a carrier signal.

This allows short circuits to be detected precisely even in the case of low speeds of an electric machine having the electrical system or even when the electric machine is at a standstill.

The inverter unit may be configured to modulate the temporally varying signal based on a measured speed. Particularly efficient measurement is thus made possible because the modulation may be restricted to the speed ranges in which it has the greatest effect. Further, undesired interference may thus be avoided.

For example, the inverter unit is configured to modulate the temporally varying signal at a higher amplitude in the case of a low speed than in the case of a higher speed. Further, a threshold value for the speed may be provided. The temporally varying signal is modulated only below the threshold value.

Further, the inverter unit may be configured to modulate the temporally varying signal in an amplitude-dependent manner. This allows particularly simple control.

According to one aspect, a stator for an electric machine is provided. The stator includes a body having a plurality of stator teeth, and the electrical system according to any configuration described herein. In this case, the tooth windings of the first star circuit and the second star circuit are each wound around one of the stator teeth.

According to one aspect, an electric machine is provided. The electric machine includes the stator according to any configuration described herein. The electric machine may further include a rotor that is mounted movably (e.g., rotatably) relative to the stator.

In the electric machine, the stator provides, for example, a substantially circular opening for accommodating the rotor. The rotor is arranged in the opening, for example, in a rotatably mounted manner. An air gap is formed between the rotor and the stator. This type of construction is also referred to as an internal rotor. Alternatively, a type of construction in which the rotor radially surrounds the stator is provided. Such types of construction are also referred to as external rotors. The electric machine is an apparatus that converts electrical energy into mechanical energy (e.g., kinetic energy) in a motor mode and/or mechanical energy into electrical energy in a generator mode. The movement is, for example, a rotational movement performed by the rotor. The stator is, for example, arranged in a rotationally fixed manner with respect to a mount bearing the electric machine. A rotational movement is therefore, for example, a rotational movement of the rotor in relation to the stator.

According to one aspect, a vehicle (e.g., an aircraft) including the electric machine according to any configuration described herein (e.g., for driving a thrust-generating apparatus, such as a propeller) is provided. As already mentioned at the outset, the advantages of the electric machine described herein apply especially to a vehicle (e.g., an aircraft).

BRIEF DESCRIPTION OF THE DRAWINGS

Embodiments will now be described by way of example with reference to the figures, in which:

FIGS. 5A and 5B show schematic illustrations of an electrical system for the electric machine having a plurality of star circuits that are electrically connected to one another via star points;

FIG. 6 shows a schematic illustration of an electrical system for the electric machine having a plurality of star circuits and a measuring device having a plurality of magnetic couplers;

DETAILED DESCRIPTION

Figure 1:
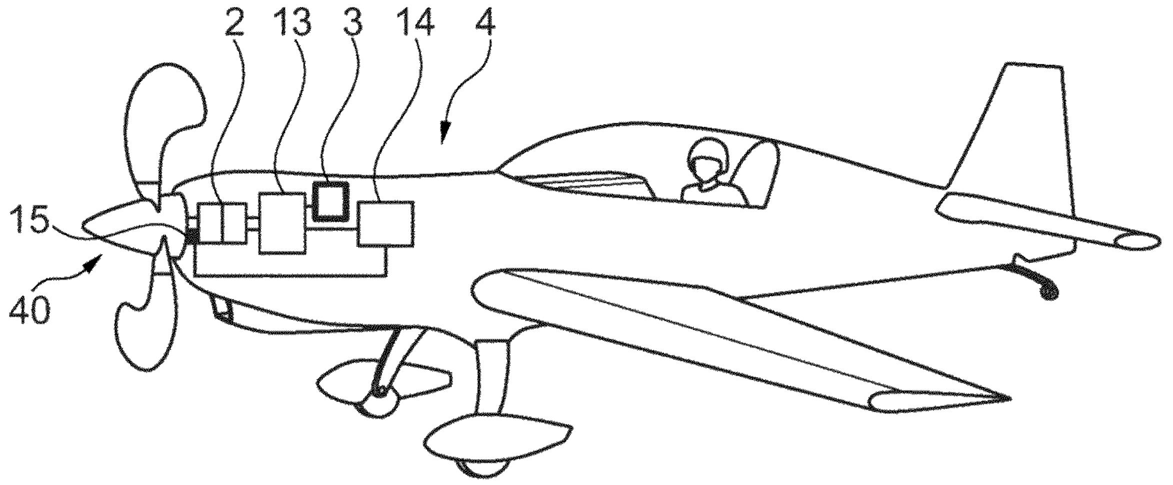
FIG. 1 shows an aircraft in the form of an airplane having an electrically driven propeller and an electric machine.

FIG. 1 shows one embodiment of an aircraft 4 in the form of an electrically driven airplane. The aircraft 4 includes a propeller 40 that is driven by an electric machine 2 described in more detail below.

The aircraft 4 further includes an inverter unit 13 that is supplied with electrical energy by an energy source 3. A control unit 14 controls the inverter unit 13. The control unit 14 measures a speed of the electric machine 2 (e.g., by a speed sensor 15).

The electric machine 2 may be operated as an electric motor; alternatively or additionally, the electric machine 2 may be operated as a generator.

Figure 2:
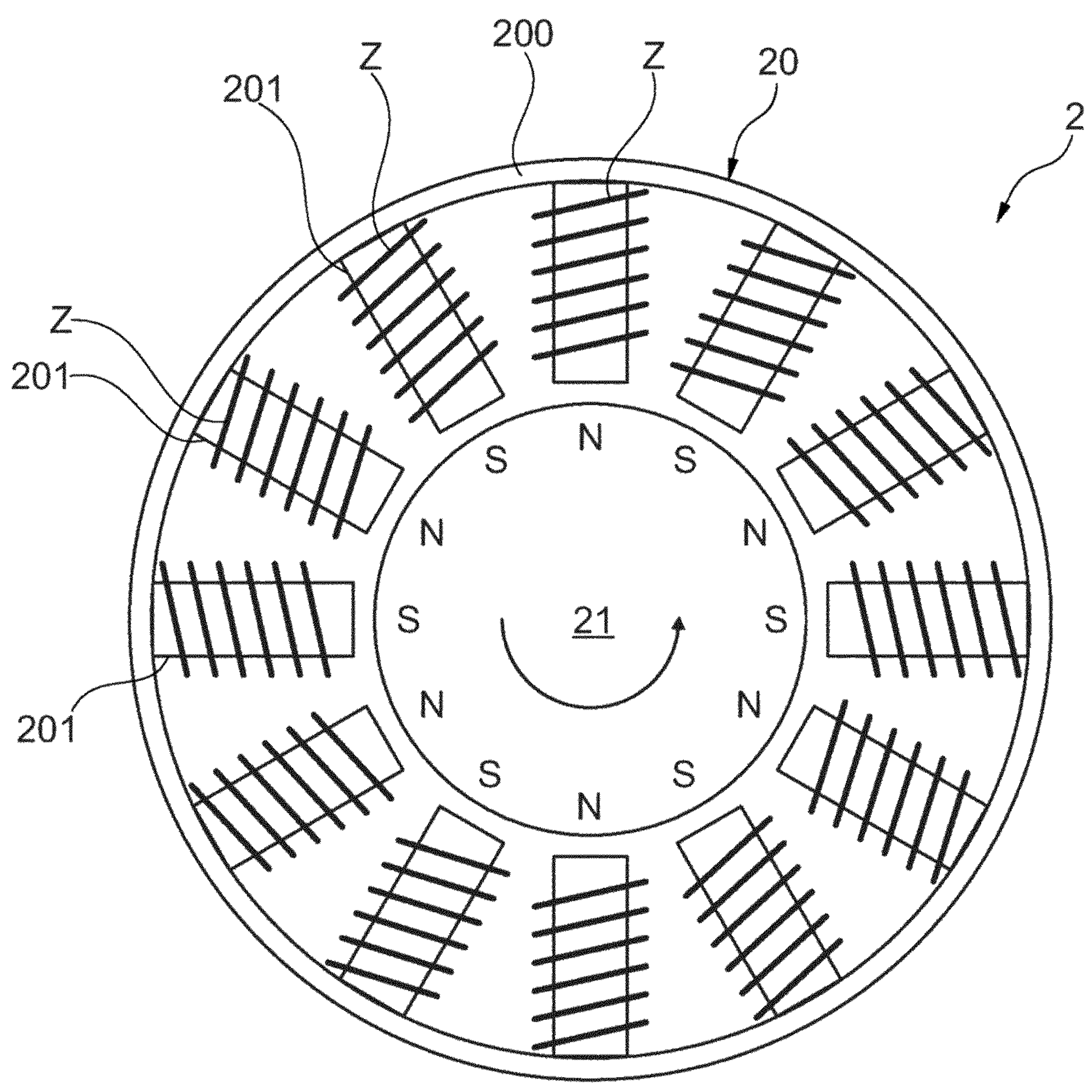
FIG. 2 shows a schematic illustration of a basic construction of a permanently excited electric machine in the form of an internal rotor.

FIG. 2 shows a schematic illustration of one embodiment of a rotating electric machine 2 of the aircraft 4 in the form of a permanently excited synchronous machine. FIG. 2 shows that the electric machine 2 in the present case is in the form of an internal rotor. The electric machine 2 includes a stator 20 that has an opening (e.g., a through-opening that is not denoted), in which a rotor 21 is arranged in a rotatably mounted manner about a rotation axis.

The stator 20 includes a body 200 (e.g., in the form of a laminated core), on which stator teeth 201 are fixed. An air gap is formed between the body 200 of the stator 2 and the rotor 21. The stator teeth 201 protrude radially from the body 200 (e.g., radially inward in a direction of the rotation axis). The stator 20 has a plurality of tooth windings Z. The plurality of tooth windings Z are generally designed for at least three-phase operation (e.g., in the present case, for three-phase operation). In other words, the plurality of tooth windings Z are connected or able to be connected to a three-phase AC voltage having phases U, V, W. During intended operation of the electric machine 2, the AC voltage is applied to the plurality of tooth windings Z as appropriate.

The rotor 21 includes permanent magnets in order to provide a magnetic flux. In the present configuration, the rotor 21 has a plurality of magnetic north poles N and magnetic south poles S alternating in a circumferential direction about the rotation axis. In alternative configurations, it is also possible to provide exactly one magnetic north pole N and exactly one magnetic south pole.

The rotor 21 is rotatably mounted. As a result of the three-phase AC voltage, the phases U, V, W thereof each being phase-shifted by 120°, a magnetic rotating field is generated during intended operation. The magnetic rotating field interacts with the permanently excited magnetic field provided by the rotor 21 such that a corresponding rotational movement of the rotor 21 in relation to the stator 20 may be brought about in motor mode. In the present case, the electric machine 2 is used as a drive motor for the aircraft 4 according to FIG. 1.

The inverter unit 13 shown in FIG. 1 provides the electric AC voltage having the three phases U, V, W. The inverter unit 13 obtains the electrical energy required for the intended operation from the energy source 3 connected to the inverter unit 13. In the present configuration, the energy source 3 is a DC voltage source that provides electrical energy from a suitable electrical energy store (e.g., a battery or the like). Alternatively or additionally, fuel cells and/or the like or, in the case of stationary applications, an energy supply from a public energy supply network may also be provided.

The inverter unit 13 has inverter modules assigned for the provision of the phases U, V, W (e.g., having in each case at least one half-bridge circuit). The half-bridge circuit has a series circuit including two electronic switching elements (e.g., transistors) that are connected to a link circuit DC voltage of the inverter unit 13. The electronic switching elements are operated by the control unit 14 in a clock mode that provides clock patterns in the form of a PWM signal, for example. The corresponding phase U, V, W of the three-phase AC voltage is then available at a respective center tap of the half-bridge circuits. Appropriate filtering is carried out by the inductance of the tooth windings Z, with the result that a corresponding AC current is obtained for each of the phases U, V, W. The AC current may be virtually sinusoidal if the inverter units are suitably controlled.

As already mentioned, the stator teeth 201 are equipped with the respective tooth windings Z. Each one of the tooth windings Z surrounds (e.g., exactly) one stator tooth 201. Each of the tooth windings Z has an electrical conductor that is arranged in a plurality of turns running around the respective stator tooth 201. The tooth windings Z are connected up in the electric machine 2 as appropriate such that the three-phase connection to the inverter unit 13 is present.

By way of example, the electric machine 2 has twelve poles. The stator 20 therefore has twelve stator teeth 201. The twelve stator teeth 201 are arranged equidistantly in the circumferential direction in the present case.

Figures 3A, 3B, 4A, 4B:
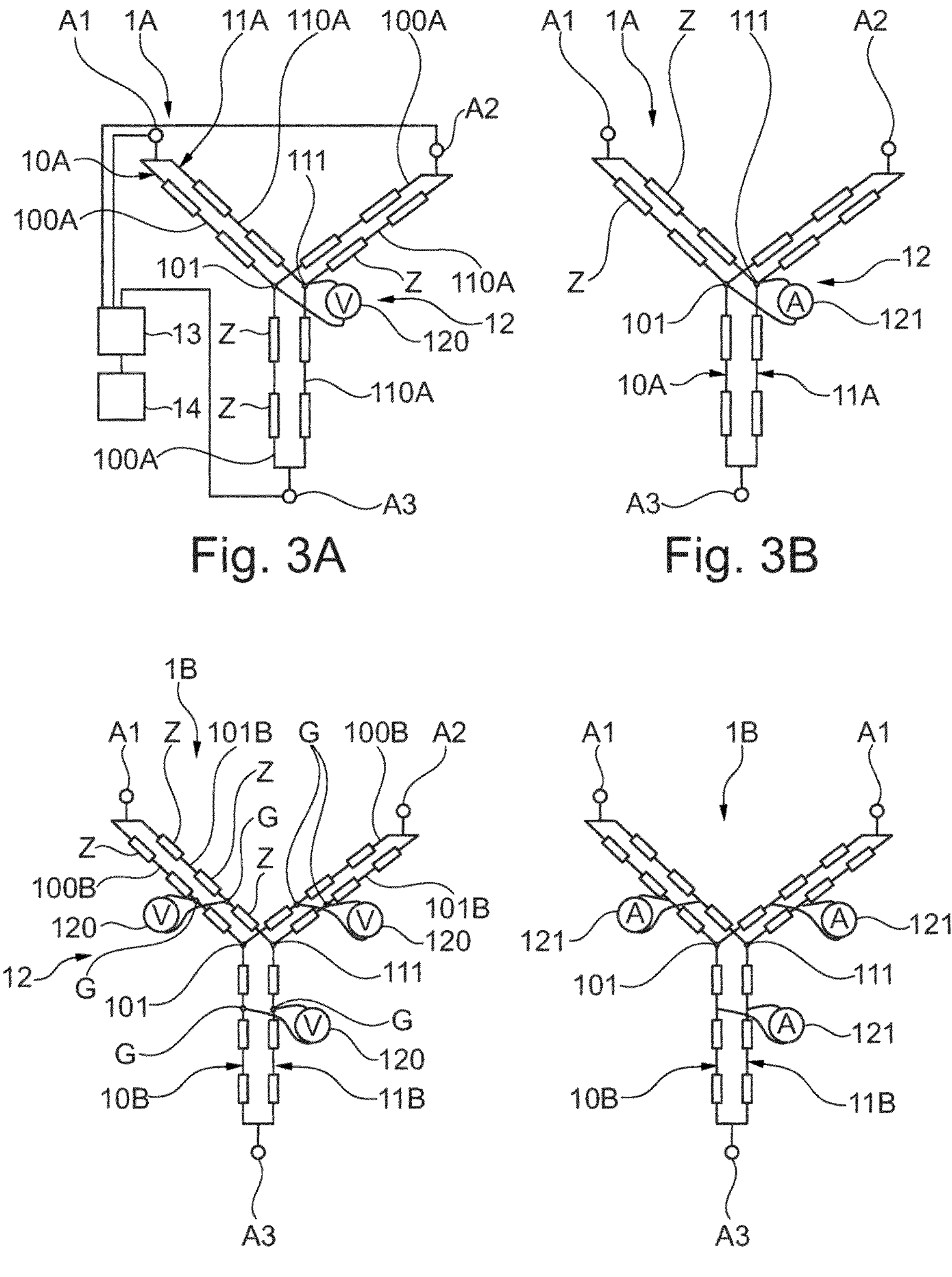
FIGS. 3A and 3B show schematic illustrations of an electrical system for the electric machine having a plurality of star circuits and a measuring device.
FIGS. 4A and 4B show schematic illustrations of an electrical system for the electric machine having a plurality of star circuits and a measuring device having measuring apparatuses on a plurality of strands.

FIG. 3A shows one embodiment of an electrical system 1A with an electrical interconnection of the tooth windings Z and of the inverter unit 13 of the electric machine 2 according to FIG. 2.

The electrical system 1A includes three connections A1, A2, A3, each for electrical connection to one phase of three phases of the three-phase AC voltage. As illustrated in FIG. 3A, each of the three connections A1-A3 is electrically connected to the inverter unit 13.

The electrical system 1A further includes two parallel star circuits 10A, 11A that are both electrically connected to each of the three connections A1-A3. Specifically, provision is made for a first star circuit 10A that includes three electrically conducting strands 100A via each of which one of the three connections A1-A3 is electrically connected to a common star point 101 of the first star circuit 10A-10C. Each of the three strands 100A interconnected in a star shape may include at least one tooth winding Z (e.g., two tooth windings Z connected in series). A second star circuit 11A likewise includes three electrically conducting strands 110A via each of which one of the three connections A1-A3 is electrically connected to a common star point 111 of the second star circuit 11A. Each of the three strands 110A interconnected in a star shape may include at least one tooth winding Z (e.g., two tooth windings Z connected in series). Each of the three connections A1-A3 is electrically connected to the star point 101 of the first star circuit 10A via one strand 100A of the first star circuit 10A and electrically connected to the star point 111 of the second star circuit 11A via one strand 110A of the second star circuit 11A. A branch is therefore provided at each of the three connections A1-A3.

Each of the tooth windings Z is wound (e.g., a number of times) around a respective stator tooth 201 (or generally around one tooth).

The corresponding three strands 100A, 110A are electrically connected to one another at the star point 101, 111 of each of the star circuits 10A, 11A.

Further, the electrical system 1A further includes a measuring device 12 that is electrically connected between the first star circuit 10A and the second star circuit 11A, for measuring an electrical variable. The measuring device 12 includes a voltmeter 120. The voltmeter 120 is electrically connected to the two star points 101, 111 in order to measure the electrical voltage between the two star points 101, 111 of the two star circuits 10A, 11A. For this purpose, an electrical conductor connects the voltmeter 120 to the star point 101 of the first star circuit 10A, and a further electrical conductor connects the voltmeter 120 to the star point 111 of the second star circuit 11A. If a short circuit occurs in one of the tooth windings Z, this then results in a voltage between the two parallel star circuits 10A, 11A. Measuring such a voltage using the voltmeter 120 (e.g., a voltage above a preset or settable threshold value) therefore allows a short circuit to be detected.

In order to evaluate the electrical variable (e.g., the voltage), the electrical system 1A may include an evaluation unit. For example, the control unit 14 serves as the evaluation unit. Alternatively or in addition, an external component serves as the evaluation unit. The control unit 14 controls (and regulates) the inverter unit 13 (e.g., that may also have a different design and may generally be referred to as a power supply unit). The evaluation unit may include a high-pass filter by which the measured electrical variable is optionally filtered.

If a short circuit is detected, a countermeasure may then be initiated (e.g., stopping the electric machine 2). Alternatively or in addition, two of the three connections A1-A3 or all three connections A1-A3 are short-circuited together as a countermeasure (e.g., by the inverter unit 13).

Measuring the electrical variable between the two star circuits 10A, 11A may considerably lessen saturation effects and external influences.

The electric machine 2 optionally includes a plurality of electrical systems 1A according to FIG. 3A (or according to another configuration described herein), as is schematically illustrated in FIG. 1 via a dividing line on the electric machine 2. If a short circuit causes one of the electrical systems 1A to fail, the remaining electrical system 1A may then continue to be operated.

FIG. 3B shows the electrical system 1A according to FIG. 3A, where in FIG. 3A (and also in the FIGS. 4A to 6 described below), the inverter unit 13 and the control unit 14 are not depicted again purely for the sake of simplified illustration. According to FIG. 3B, the measuring device 12 includes an ammeter 121 for measuring an electrical current as the electrical variable. Like the voltmeter 120 according to FIG. 3A, the ammeter 121 is electrically connected between the two star points 101, 111 of the two star circuits 10A, 11A. The ammeter 121 may therefore measure an electrical current between the two star circuits 10A, 11A (e.g., more specifically, between the star points 101, 111 of the two star circuits 10A, 11A). The evaluation takes place in accordance with the evaluation of the voltage. Measuring the current allows a short circuit to be detected in a particularly reliable manner. In an undamaged state, no compensating current or a compensating current having only a negligible current flows. If a current is measured (e.g., optionally above a predefined threshold value), a short circuit is detected.

The measuring device 12 optionally includes both a voltmeter 120 and an ammeter 121.

FIG. 4A shows an electrical system 1B for the electric machine 2 according to FIG. 2. The electrical system 1B includes a first star circuit 10B with three strands 100B and a second star circuit 11B with three strands 110B. The electrical system 1B according to FIG. 4A has a similar design to the electrical system according to FIG. 3A, and so, only differences are described below. For example, the measuring device 12 of the electrical system 1B includes more than one measuring apparatus. In the present case, the measuring device 12 according to FIG. 4A includes three measuring apparatuses (e.g., three voltmeters 120). Each of the voltmeters 120 is electrically connected between one strand 100A of the first star circuit 10B and one strand of the second star circuit 11B. In this case, the connection of each of the voltmeters 120 is in each case provided at a tap G on the corresponding two strands 100B, 110B. Each voltmeter 120 is thus electrically connected to the tap G of one strand 100B of the first star circuit 10B via an electrical conductor and electrically connected to the tap G of one strand 110B of the second star circuit 11B via an electrical conductor. These two taps G form a pair of taps G assigned to the measuring apparatus. In the present case, the taps G are each arranged between two tooth windings Z (e.g., in relation to the flow of electrical current). Each of the taps G is thus electrically connected to one of the connections A1-A3 via at least one tooth winding Z (e.g., in this example, two tooth windings Z connected in series) and electrically connected to the corresponding star point 101, 111 via at least one further tooth winding Z (e.g., in this example, exactly one tooth winding Z).

By virtue of the fact that each strand 100B, 110B is assigned its own measuring apparatus, particularly precise detection and location of a short circuit is possible.

In the present case, the electrical system 1B includes 18 tooth windings Z in total.

FIG. 4B shows the electrical system 1B according to FIG. 4A, where the measuring device 12 according to FIG. 4B includes three ammeters 121, each for measuring an electrical current as the electrical variable. The ammeters 121 are connected like the voltmeters 120 according to FIG. 4A.

The potential at symmetrical nodes of the two star circuits 10B, 11B may thus be measured; alternatively or additionally, a compensating current therebetween may be measured.

FIG. 5A shows one embodiment of an electrical system 1C for the electric machine 2 according to FIG. 2. The electrical system 1C includes a first star circuit 10C with three strands 100C and a second star circuit 11C with three strands 110C. The electrical system 1C according to FIG. 5A has a similar design to the electrical system according to FIG. 4A, and so, only differences are described below. For example, the electrical system 1C according to FIG. 5A includes a connecting conductor 16 that electrically connects the two star points 101, 111 to one another (e.g., more precisely, short-circuits the two star points 101, 111 together). The connecting conductor 16 is an electrical conductor and connected at one end to the star point 101 of the first star circuit 10C and connected at the other end to the star point 111 of the second star circuit 11C (e.g., in each case, directly and without interposition of tooth windings Z). This allows particularly high measurement accuracy (e.g., in the case of strands with a particularly large number of tooth windings Z connected in series).

In this example, each of the strands 100C, 110C of the first star circuit 10C and the second star circuit 11C includes four tooth windings Z connected in series. The taps G are each provided between two series-connected pairs of tooth windings. Such a symmetrical arrangement allows accurate measurement results.

Alternatively, the connecting conductor 16 may also be electrically connected at nodes that are connected symmetrically to one other, between in each case two tooth windings Z of two strands 100C, 110C of the first star circuit 10C and the second star circuit 11C.

FIG. 5B shows the electrical system 1C according to FIG. 5A, where the measuring device 12 according to FIG. 5B includes three ammeters 121, each for measuring an electrical current as the electrical variable. The ammeters 121 are connected like the voltmeters 120 according to FIG. 5A. The measuring device 12 may include one voltmeter 120 or a plurality of voltmeters 120 and/or one ammeter 121 or a plurality of ammeters 121.

FIG. 6 shows the electrical system 1B according to FIG. 4A, where the measuring device 12 according to FIG. 6 has three pairs of taps G corresponding to FIG. 4A. However, voltmeters 120 or ammeters 121 are not directly connected to the taps G. Instead, a magnetic coupler 122 (or generally a coupler of some kind) in the form of, for example, a transformer is connected to each pair of taps G. Each of the couplers 122 has a primary side and a secondary side. An AC voltage on the primary side induces an AC voltage on the secondary side. The secondary sides of the couplers 122 are connected in series with one another. A voltmeter 120 (e.g., alternatively or additionally an ammeter 121) is connected to the series-connected secondary sides of the couplers 122.

In this way, it is possible to carry out particularly precise measurements using particularly few or even only one single measuring apparatus (e.g., if only a few signal channels for the evaluation are available).

The described electrical systems 1A-1C allow short circuits to be detected in a reliable manner with a simple construction in each case. The detection may be more precise in the case of high speeds than in the case of low speeds.

Figure 7:
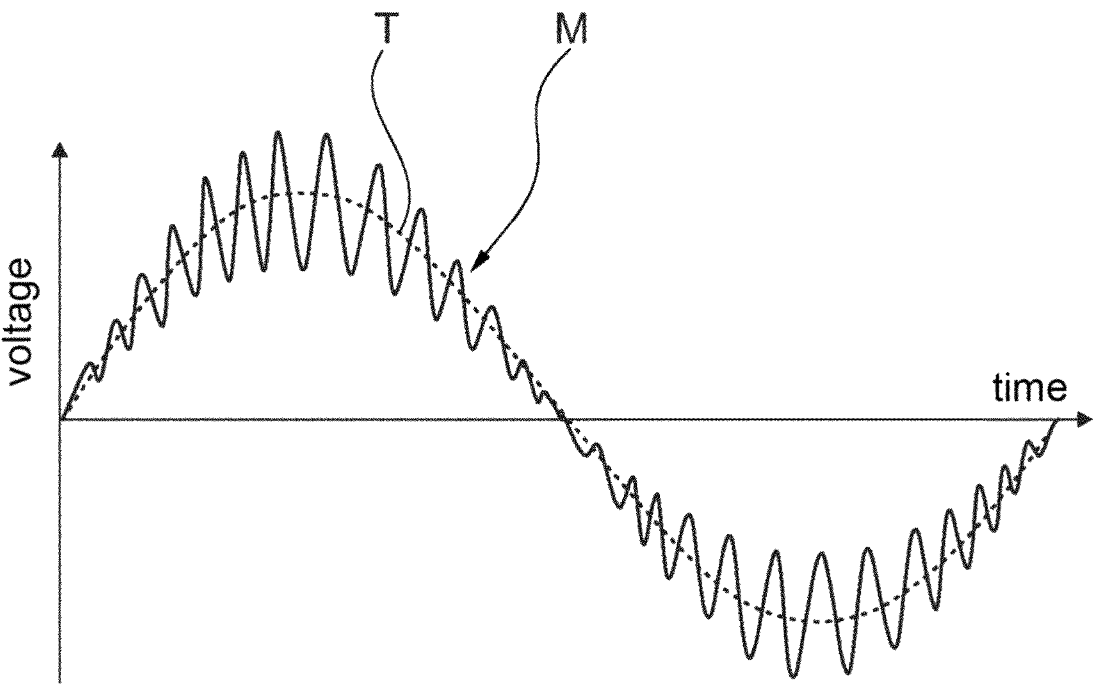
FIG. 7 shows a graph of a carrier signal with a temporally varying signal modulated thereon against time.

With reference to FIG. 7, it will now be explained how short circuits may be detected with high precision even in the case of low speeds or even at a standstill. The control unit 14 (e.g., of each electrical system 1A-1C described herein) is optionally designed such that the control unit 14 modulates a temporally varying signal M onto the voltage, provided at the connections A1-A3, as carrier signal T. The frequency of the temporally varying signal M is, for example, higher than that of the carrier signal T. For example, the frequency of the temporally varying signal M is 100 Hz or more and/or 300 Hz or less (e.g., 200 Hz). The carrier signal T serves to drive the electric machine 2. The higher-frequency, temporally varying signal M allows voltages and resulting currents to be detected even in the case of low speeds or at a standstill.

In the present case, with respect to the carrier signal T, the temporally varying signal M has an amplitude that is dependent on the amplitude of the carrier signal T. The temporally varying signal M is thus greatest in the region of the maximum or minimum of the carrier signal T.

Optionally, the temporally varying signal M is modulated only below a predetermined speed and/or at an amplitude that is dependent on the speed of the electric machine 2.

Figure 8:
FIG. 8 shows a graph of an amplitude of the modulated signal against a speed of the electric machine.

FIG. 8 shows an example of a control curve of the control unit 14. In this case, the current of the temporally varying signal M is plotted against the speed of the electric machine 2. Further, the maximum speed of the electric machine 2 and 10% of this maximum speed are depicted in FIG. 8. FIG. 8 shows that this current is greatest when the electric machine 2 is at a standstill and then drops as the speed increases. In this case, the curve has a turning point that lies at 10% of the maximum speed in the present example. The current is zero above a predetermined value of the speed (e.g., approximately 20% of the maximum speed). Alternatively, however, the temporally varying signal M may be applied over the entire operating range, optionally at an amplitude that is independent of the speed.

Optionally, the control unit 14 measures the speed via the speed sensor 15 (see FIG. 1). However, sensorless-control injection methods may be used. For example, an injection vector may be oriented based on the d-axis of the rotor in order to minimize excitation of shafts in terms of force or torque. Optionally, the phase of the temporally varying signal M is adapted to match the phase of the carrier signal T.

Instead of an application in a pure electric drive, an application in a hybrid electric drive may also be provided. In this case, the electric machine 2 is, for example, fixed directly to a shaft of an internal combustion engine (e.g., of a turbine engine). In the above-described control method, the internal combustion engine may continue to be operated in the event that a short circuit causes the electric machine to fail. As a result of this, the failure rate may be significantly improved.

The electrical system 1A-1C allows increased safety and improved reliability. Additional emergency brakes are not necessary. As a result of this, the number of components may be reduced, and the complexity may be lessened. The electrical system may also be used, for example, in a gas pump, in a ship propulsion device, in a wind turbine, in a rail vehicle drive, or in a medical apparatus.

The invention is not limited to the above-described embodiments, and different modifications and improvements may be carried out without deviating from the concepts described here. Any of the features may be used separately or in combination with any other features, unless they are mutually exclusive, and the disclosure extends to and includes all combinations and subcombinations of one or more features that are described herein.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An electrical system for an electric machine, the electrical system comprising:

at least three connections for electrical connection to in each case one phase of an at least three-phase AC voltage;

a first star circuit with three strands via each of which one of the at least three connections is electrically connected to a common star point of the first star circuit and which each have at least two tooth windings that are connected in series;

a second star circuit with three strands via each of which one of the at least three connections is electrically connected to a common star point of the second star circuit and which each have at least two tooth windings that are connected in series; and a measuring device that is electrically connected between the first star circuit and the second star circuit, the measuring device being configured for measuring an electrical variable, wherein the measuring device is directly connected between the common star point of the first star circuit and the common star point of the second star circuit.

2. The electrical system of claim 1, wherein the measuring device comprises a voltmeter, an ammeter, or the voltmeter and the ammeter.

3. The electrical system of claim 1, wherein the measuring device is connected in each case between two tooth windings of one strand of the three strands of the first star circuit and between two tooth windings of one strand of the three strands of the second star circuit.

4. The electrical system of claim 3, wherein the measuring device is electrically connected to the one strand of the first star circuit and the one strand of the second star circuit, between which the measuring device is connected, at a tap in each case, and wherein for the one strand of the first star circuit and the one strand of the second star circuit, a same number of tooth windings are arranged between a respective connection of the at least three connections and the respective tap as between the respective tap and a respective star point of the common star point of the first star circuit and the common star point of the second star circuit.

5. The electrical system of claim 3, wherein the one strand of the first star circuit and the one strand of the second star circuit, between which the measuring device is connected, connect the first star circuit and the second star circuit, respectively, to a same connection of the at least three connections.

6. The electrical system of claim 5, wherein the measuring device comprises for each phase a respective voltmeter, ammeter, or voltmeter and ammeter that are electrically connected between in each case two tooth windings of the strands that are connected to the same connection.

7. The electrical system of claim 3, wherein the measuring device comprises a voltmeter, an ammeter, or the voltmeter and the ammeter that are operatively connected to the strands of each phase via a plurality of magnetic couplers.

8. The electrical system of claim 1, wherein the common star point of the first star circuit and the common star point of the second star circuit are electrically connected to one another directly by a connecting conductor.

9. An electrical system for an electric machine, the electrical system comprising:

at least three connections for electrical connection to in each case one phase of an at least three-phase AC voltage;

a first star circuit with three strands via each of which one of the at least three connections is electrically connected to a common star point of the first star circuit and which each have at least one tooth winding;

a second star circuit with three strands via each of which one of the at least three connections is electrically connected to a common star point of the second star circuit and which each have at least one tooth winding;

a measuring device that is electrically connected between the first star circuit and the second star circuit, the measuring device being configured for measuring an electrical variable; and an inverter unit configured for providing the at least three-phase AC voltage, the inverter unit being connected to the at least three connections, wherein the inverter unit is configured to modulate a temporally varying signal onto the at least three-phase AC voltage as a carrier signal, and wherein the measuring device is connected in each case between two tooth windings of one strand of the three strands of the first star circuit and between two tooth windings of one strand of the three strands of the second star circuit.

10. The electrical system of claim 9, wherein the inverter unit is configured to modulate the temporally varying signal based on a measured speed.

11. The electrical system of claim 10, wherein the inverter unit is configured to modulate the temporally varying signal at a higher amplitude in the case of a low speed than in the case of a higher speed.

12. The electrical system of claim 9, wherein the inverter unit is configured to modulate the temporally varying signal in an amplitude-dependent manner.

13. A stator for an electric machine, the stator comprising:

a body having a plurality of stator teeth; and an electrical system for the electric machine, the electrical system comprising:

at least three connections for electrical connection to in each case one phase of an at least three-phase AC voltage;

a first star circuit with three strands via each of which one of the at least three connections is electrically connected to a common star point of the first star circuit and which each have at least two tooth windings that are connected in series;

a second star circuit with three strands via each of which one of the at least three connections is electrically connected to a common star point of the second star circuit and which each have at least two tooth windings that are connected in series; and a measuring device that is electrically connected between the first star circuit and the second star circuit, the measuring device being configured for measuring an electrical variable, wherein the tooth windings of the first star circuit and the second star circuit are each wound around one stator tooth of the plurality of stator teeth, and wherein the measuring device is directly connected between the common star point of the first star circuit and the common star point of the second star circuit.

14. An electric machine comprising:

a stator comprising:

a body having a plurality of stator teeth; and an electrical system comprising:

at least three connections for electrical connection to in each case one phase of an at least three-phase AC voltage;

a first star circuit with three strands via each of which one of the at least three connections is electrically connected to a common star point of the first star circuit and which each have at least two tooth windings that are connected in series;

a second star circuit with three strands via each of which one of the at least three connections is electrically connected to a common star point of the second star circuit and which each have at least two tooth windings that are connected in series; and a measuring device that is electrically connected between the first star circuit and the second star circuit, the measuring device being configured for measuring an electrical variable, wherein the tooth windings of the first star circuit and the second star circuit are each wound around one stator tooth of the plurality of stator teeth; and a rotor that is mounted rotatably relative to the stator, wherein the measuring device is connected in each case between two tooth windings of one strand of the three strands of the first star circuit and between two tooth windings of one strand of the three strands of the second star circuit.

15. An aircraft comprising:

an electric machine comprising:

a stator comprising:

a body having a plurality of stator teeth; and an electrical system comprising:

at least three connections for electrical connection to in each case one phase of an at least three-phase AC voltage;

a first star circuit with three strands via each of which one of the at least three connections is electrically connected to a common star point of the first star circuit and which each have at least two tooth windings that are connected in series;

a second star circuit with three strands via each of which one of the at least three connections is electrically connected to a common star point of the second star circuit and which each have at least two tooth windings that are connected in series; and a measuring device that is electrically connected between the first star circuit and the second star circuit, the measuring device being configured for measuring an electrical variable, wherein the tooth windings of the first star circuit and the second star circuit are each wound around one stator tooth of the plurality of stator teeth; and a rotor that is mounted rotatably relative to the stator, wherein the measuring device is directly connected between the common star point of the first star circuit and the common star point of the second star circuit.

* * * * *